United States Patent [19]
Kodama et al.

[11] Patent Number: 5,904,441
[45] Date of Patent: May 18, 1999

[54] STRUCTURE AND METHOD FOR CONNECTING AND FIXING INSTRUMENTS

[75] Inventors: Shinji Kodama; Kiyohito Fukuda, both of Shizuoka, Japan

[73] Assignee: Yazaki Corporation, Tokyo, Japan

[21] Appl. No.: 08/962,389

[22] Filed: Oct. 31, 1997

[30] Foreign Application Priority Data

Nov. 1, 1996 [JP] Japan .................................. 8-292008

[51] Int. Cl.⁶ ............................................. F16B 3/00
[52] U.S. Cl. .................... 403/337; 439/364; 439/248; 403/11
[58] Field of Search .................. 439/364, 248, 439/34; 403/337, 321, 322.1, 329, 21, 11; 411/546, 539

[56] References Cited

U.S. PATENT DOCUMENTS

| | | | |
|---|---|---|---|
| 5,120,243 | 6/1992 | Mee | 439/364 X |
| 5,588,865 | 12/1996 | Yamamoto | 439/364 |
| 5,676,552 | 10/1997 | Fakuda et al. | 439/34 |
| 5,711,630 | 1/1998 | Kodama | 403/329 |
| 5,771,151 | 6/1998 | Hotea et al. | 439/364 X |
| 5,813,880 | 9/1998 | Kodama | 439/364 |
| 5,836,787 | 11/1998 | Kodama | 439/364 X |

*Primary Examiner*—Harry C. Kim
*Assistant Examiner*—David E. Bochna
*Attorney, Agent, or Firm*—Armstrong, Westerman, Hattori, McLeland & Naughton

[57] ABSTRACT

An instrument is provided with a first connector, and an instrument panel is provided with a second connector. A bolt is provided extending from the first connector toward the second connector. A first thread is provided in the second connector, corresponding to the bolt. A second thread is provided on the instrument panel, at a position behind the first thread. The bolt is in a first position threaded into the first thread to couple the first and second connectors together, and in a second position threaded into the second thread to fix the instrument to the instrument panel. The coupling of connectors and the fixing of an instrument to an instrument panel are effected with one and the same bolt.

15 Claims, 14 Drawing Sheets

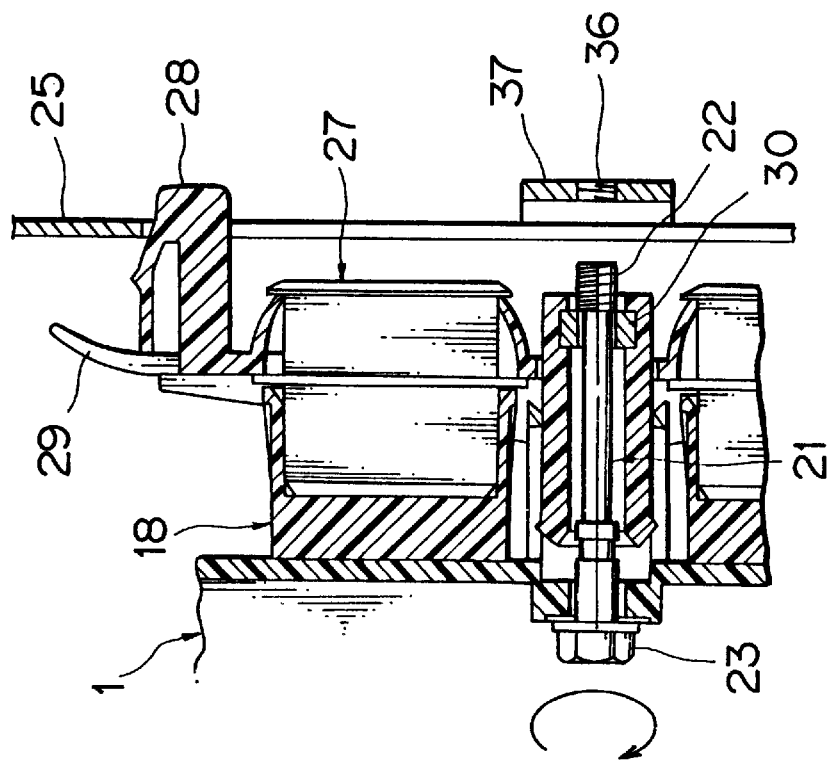
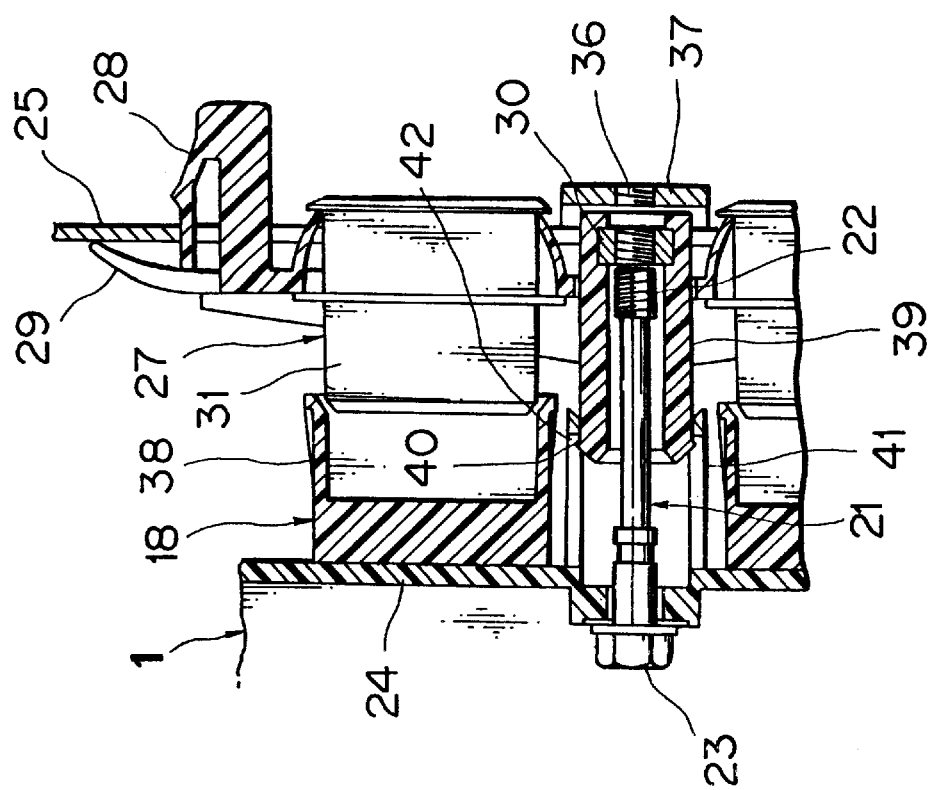

STRUCTURE AND METHOD FOR CONNECTING AND FIXING INSTRUMENTS

BACKGROUND OF THE INVENTION

1. Field of the Invention

This invention relates to a structure and a method for efficiently fixing an instrument, such as a meter unit, to an automotive instrument panel and at the same time connector-connecting the instrument with one and the same bolt.

2. Description of the Related Art

FIGS. 19 to 21 show a conventional connecting and fixing structure for instruments as proposed in Japanese Patent Application No. Hei 8-22491, in which an instrument, meter unit 100, is mounted in an instrument panel 101 as shown in FIG. 19 and connector-connected to a not-shown wiring harness on the instrument panel side.

The meter unit 100 is provided with fixed connectors 102, and the instrument panel 101 is inside a meter mount portion 103 thereof provided with movable connectors 104 in opposition to the fixed connectors 102. A bolt 115 is tightened to couple the fixed connectors 102 to the movable connectors 104. The meter unit 100 and the instrument panel 101 are each provided with four upper and lower fixing brackets 106 and 107, into which are threaded bolts 105 to fix the meter unit 100 to the instrument panel 101.

FIG. 20 shows the state in which the meter unit 100 has been fixed to the instrument panel 101, with the fixed connector 102 engaged in a preliminary locked position with the movable connector 104. The movable connector 104 is supported on a panel portion 108 via resilient arms 109 to be vertically and laterally movable, and via resilient arms 111 to be forwardly and rearwardly movable, and is preliminarily locked via projections 110 on the resilient arms 109 to the panel portion 108. The movable connector 104 has male connector portions 112 each vertically and laterally movably supported on a frame 113. The fixed connector 102 is fixed on a base plate 114 of the meter unit 100. The front end of the coupling bolt 115 is in contact with a nut 116 on the movable connector 104 side, and projections 118 on a nut support cylinder 117 are engaged in apertures 119 formed in cylinder walls surrounding the bolt.

FIG. 21 shows the state where the bolt 115 has been threaded into the nut 116 to couple the movable connector 104 to the fixed connector 102, at which time the projections 110 on the resilient arms 109 disengage from the panel portion 108 to move the movable connector 104 to the fixed connector 102. Reverse rotation of the bolt 115 decouples the connectors 102 and 104 and brings the projections 110 back into engagement with the panel portion 108.

This conventional structure, however, requires the bolts 105 for fixing the meter unit 100 to the instrument panel 101 and the bolt 115 for coupling the connectors 102, 104 together, and there is a drawback that since these bolts 105, 115 are threaded separately, the bolt threading operations are troublesome requiring many man-hours.

SUMMARY OF THE INVENTION

This invention has been accomplished to overcome the above drawback and an object of this invention is to provide an instrument connecting and fixing structure which enables an instrument, such as a meter unit, to be mounted to a panel and connector-connected to the side of the panel with an improved operability.

In order to attain the object, according to an aspect of this invention, there is provided a connecting and fixing structure for instruments, which comprises: an instrument with a first connector; an instrument panel with a second connector supported therein; a bolt provided extending from the first connector toward the second connector; a first thread means provided in the second connector, corresponding to the bolt; and a second thread means provided on the instrument panel, at a position behind the first thread means, wherein the bolt is, in a first position, threaded into the first thread means to couple the first and second connectors together, and wherein the bolt, when moved to a second position in which the bolt projects beyond the first thread means, is threadable into the second thread means to fix the instrument to the instrument panel.

The instrument is pushed in one direction in two steps to be installed in the instrument panel, making it possible for one and the same bolt to couple the connectors together and to rigidly fix the instrument in the instrument panel. This improves the poor operability in the related art which is caused by coupling the connectors and fixing the instrument with respective, different bolts at different times, provides an improved operability for an instrument to be connected and fixed, makes a reduction in man-hours and in the number of bolts used, and in the cost of parts.

Advantageously, the instrument is preliminarily locked to the instrument panel to maintain the bolt in the first position.

Advantageously, the first connector is fixed to the instrument and the second connector is movable such that the threading of the bolt into the first thread means draws the second connector into coupled relation with the first connector.

Advantageously, the bolt has a threaded portion at the front end which comes out of threaded engagement with the first thread means on completion of the coupling of the first and second connectors.

Advantageously, the instrument is pushed further inwardly of the instrument panel to move the bolt into the second position.

Advantageously, in the first-mentioned invention, the instrument is fixed relative to the instrument panel, and a spacer is provided between a head of the bolt and the first connector to put the bolt in the first position, which spacer is removed to put the bolt into the second position.

Attachment and detachment of the spacer changes the projecting length of the bolt and makes it possible, as in the preceding invention, to couple the connectors and to fix the instrument with one and the same bolt, leading to the same advantages as mentioned above.

Advantageously, the first connector is fixed to the instrument and the second connector is movable.

Advantageously, the bolt has a threaded portion at the front end which comes out of threaded engagement with the first thread means on completion of the coupling of the first and second connectors.

Advantageously, the first thread means comprises a nut.

Advantageously, the first connector comprises a pair of spaced connector portions with the bolt passing at a center therebetween, and the second connector comprises a pair of spaced connector portions with the first thread means arranged at a center therebetween.

Advantageously, two of the first connectors are provided in spaced relation at a lower end of the instrument, and two of the second connectors are correspondingly provided in spaced relation inside the instrument panel.

Advantageously, the second connector has a projection at a rear side thereof for initially arranging the second connector in position in the instrument panel.

The projection serves to handle and set the connector in the instrument panel with an improved operability, leading to an improved efficiency in connecting and fixing the instrument. Further, since no pulling at a wiring harness(es) is effected in setting the connector, terminals attached to the wiring harness(es) are prevented from being pulled out of the connector or damaged, and the like.

According to another aspect of this invention, there is provided a method for connecting and fixing an instrument with a first connector to an instrument panel with a second connector supported therein, which comprises the following steps of: threading a bolt in a first position from the first connector side to the second connector side to couple the first and second connectors together; moving the bolt to a second position in which the bolt projects beyond the first connector; and threading the bolt in the second position into the instrument panel to fix the instrument to the instrument panel.

Advantageously, the step of threading a bolt in a first position includes preliminarily locking the instrument to the instrument panel to maintain the bolt in the first position, and the step of moving the bolt to a second position comprises pushing the instrument further into the instrument panel.

Advantageously, the step of threading a bolt in a first position comprises threading the bolt with a spacer provided between a head of the bolt and the first connector, and the step of moving the bolt to a second position comprises removing the spacer.

The above and other objects, features and advantages of this invention will become apparent from the following description and the appended claims, taken in conjunction with the accompanying drawings.

BRIEF DESCRIPTION OF THE DRAWINGS

FIG. 6 is a horizontal sectional view of connectors in preliminary locked position to each other;

FIG. 8 is a horizontal sectional view of the connectors in coupled position to each other;

DESCRIPTION OF THE PREFERRED EMBODIMENTS

Embodiments of this invention will now be described with reference to the attached drawings.

FIGS. 1 to 10 show a connecting and fixing structure for instruments according to one embodiment of this invention.

Figure 1:
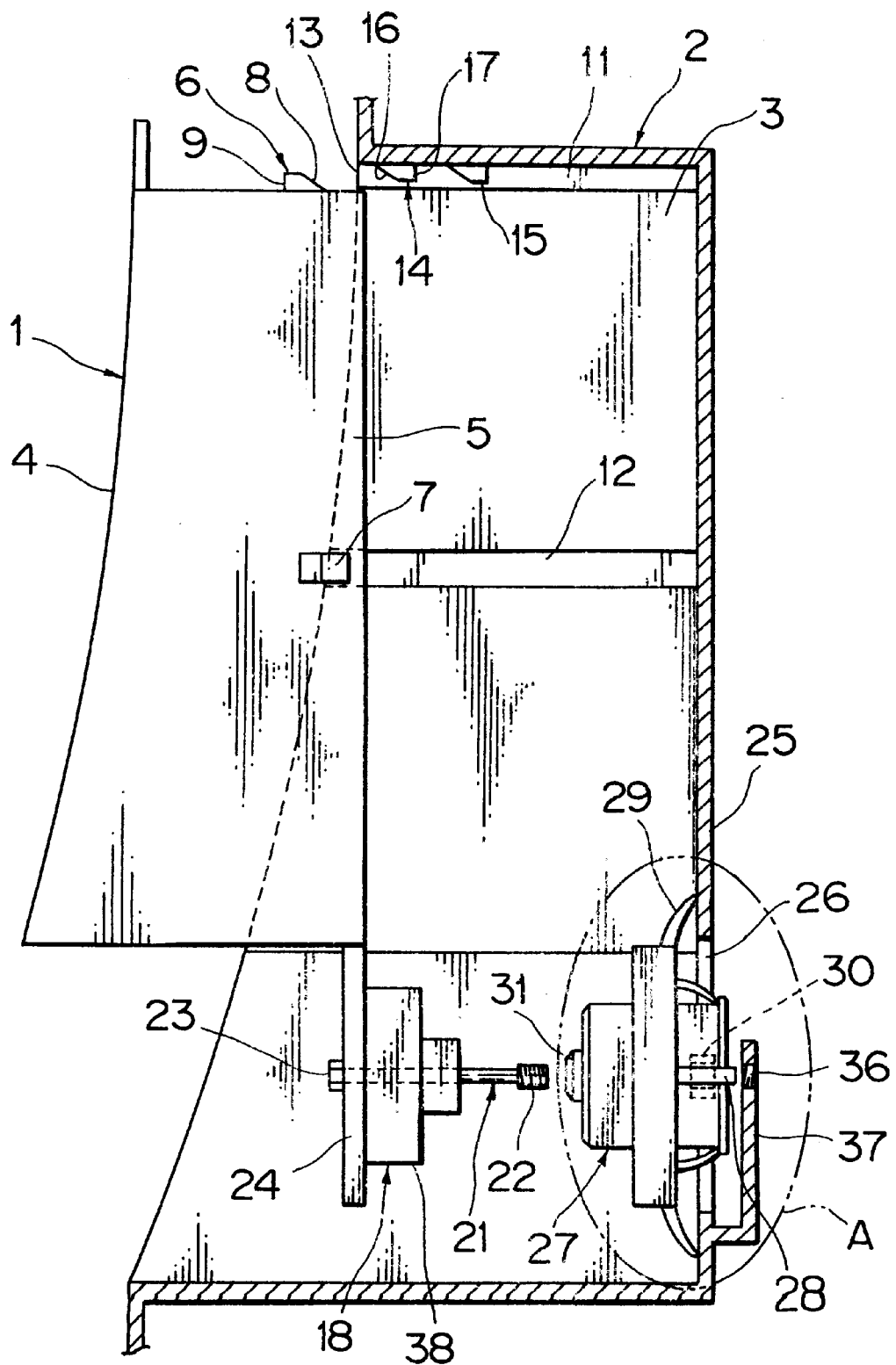
FIG. 1 is a longitudinal sectional view of an instrument connecting and fixing structure according to one embodiment of this invention.
Figure 2:
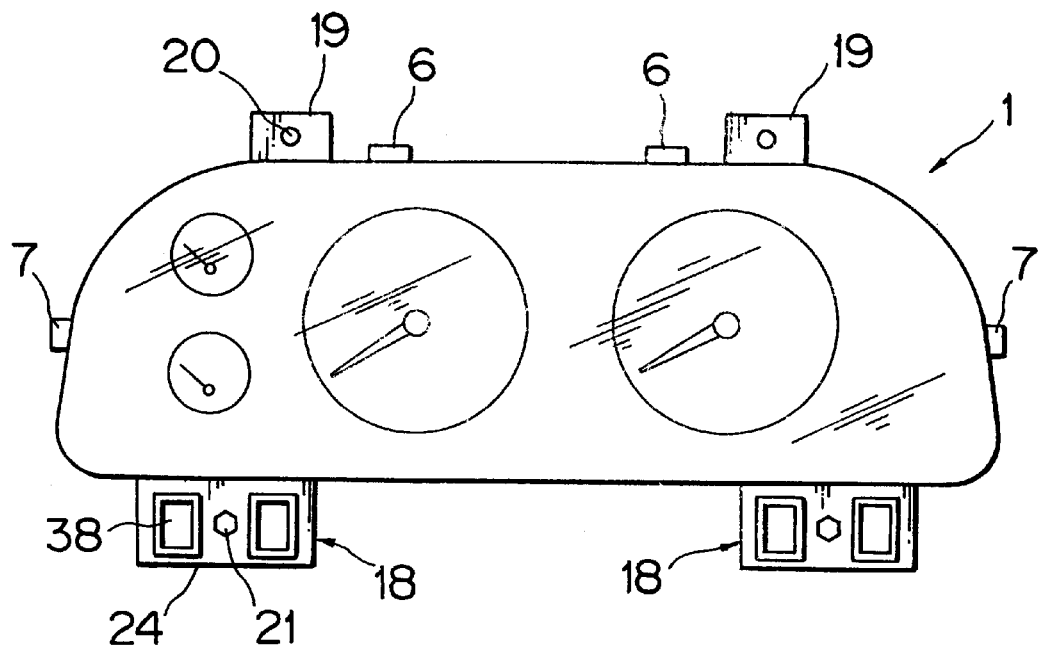
FIG. 2 is a front view of a meter unit.

In FIG. 1, a meter unit (instrument) 1 is about to be mounted in a meter mount portion 3 of an instrument panel 2, with the side of an indicating surface 4 of the meter unit 1 located on the outside of the meter mount portion 3. On upper and lateral outer walls 5 of the meter unit 1, there are provided respective pairs of lock projections 6, 7 as also shown in FIG. 2. Each lock projection 6, 7 has an inclined surface 8 at the side toward the instrument panel 2 and a vertical surface 9 at the proximal side.

The meter mount portion 3 has a meter receiving interior space, defined by inner walls 10 (FIG. 3) thereof; guide grooves 11, 12 for the related lock projections 6, 7, formed on the inner walls 10 and extending longitudinally from an opening 13 (FIG. 1) of the meter mount portion 3; and a preliminary locking projection 14 and a full locking projection 15 provided as a longitudinally spaced pair in each of the guide grooves 11. Each locking projection 14, 15 has an inclined surface 16 for sliding thereon of the inclined surface 8 of the lock projection 6 and a vertical surface 17 for abutment thereagainst of the vertical surface 9 of the lock projection 6.

Figure 20:
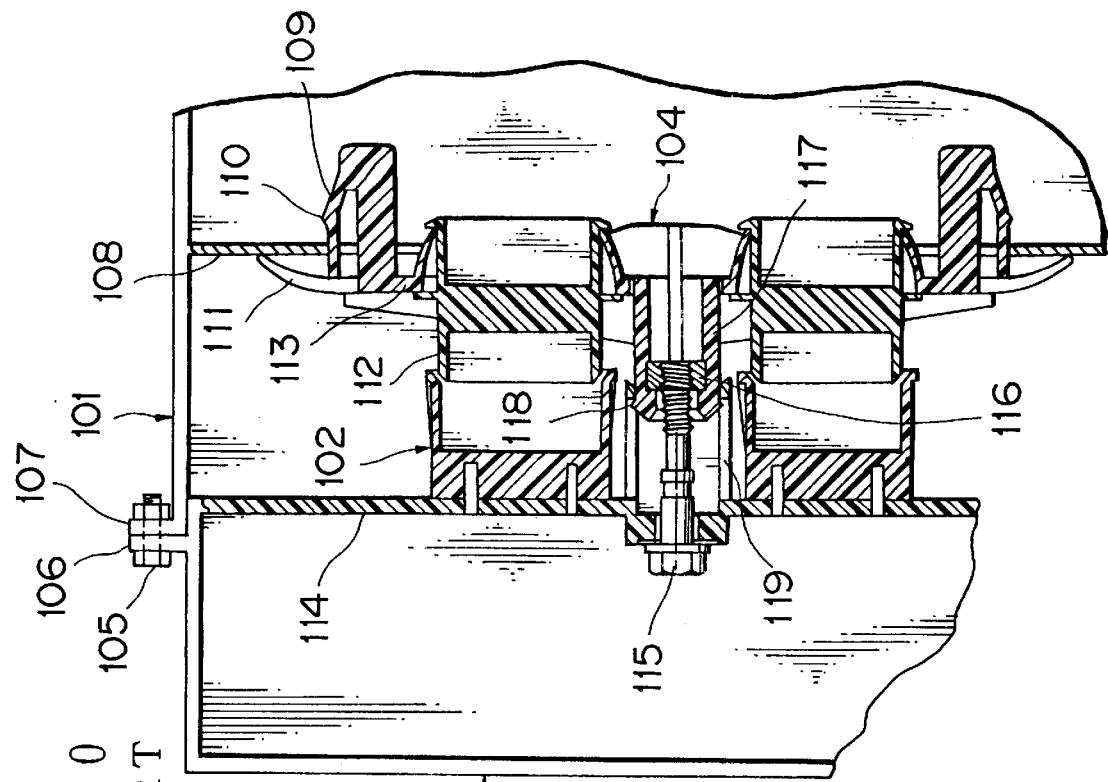
FIG. 20 is a horizontal sectional view of the conventional structure in which connectors are coupled in preliminary locked position.

The meter unit 1 is, at the lower end, integrally provided with a pair of fixed connectors (first connectors) 18 which have a basic structure similar to that of the corresponding connectors of the conventional structure (FIG. 20). The meter unit 1 has two fixing brackets 19 arranged on outer sides of the lock projections 6 on its top as viewed in FIG. 2. Each bracket 19 has a bolt insertion hole 20.

The fixed connectors 18 each have a bolt 21 rotatably extending at the center and a pair of female connector portions 38 provided on opposite sides of the bolt. The front threaded portion 22 of the bolt 21 extends forwardly beyond the fixed connector 18, and the bolt head 23 is located projecting at a fixed connector base plate 24.

In the panel portion 25 at the innermost of the meter mount portion 3 are provided openings 26 for preliminarily holding therein respective movable connectors (second connectors) 27 which also have a basic structure similar to that of the corresponding connectors of the conventional structure (FIG. 20).

Figure 4:
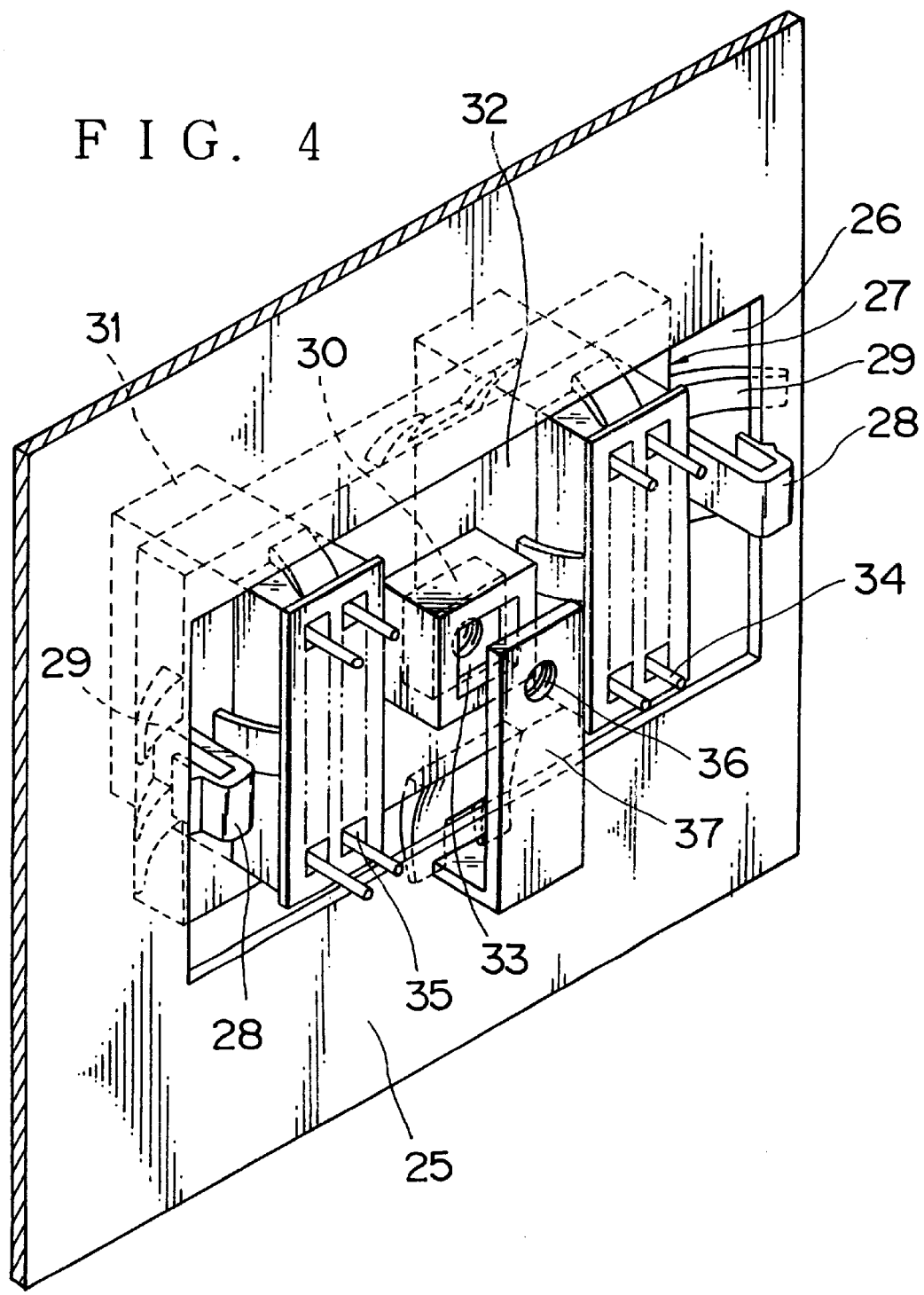
FIG. 4 is a perspective view of a movable connector at a portion A in FIG. 1.

As shown in FIG. 4, each movable connector 27 is supported vertically and laterally movable by means of four equally angularly spaced resilient arms 28 (upper and lower resilient arms are omitted from the figure), and forwardly and rearwardly by means of resilient arms 29 in contact with the front surface of the panel portion 25. The movable connector 27 has a nut 30 embedded at the center and a pair of male terminal portions 31 provided on opposite sides of the nut. A frame 32 of the movable connector 27 is formed with a bolt insertion hole 33 continuous to the nut 30 and outlet openings 35 for wiring harnesses 34 extending from the male connectors 31.

A bracket 37 is provided somewhat rearwardly of the opening 26 of the panel portion 25, the bracket having a threaded hole 36 for the bolt 21 to thread in. The bracket 37 projects from the panel portion 25, and the threaded hole 36 is located substantially at the center of the opening 26, in alignment with the bolt insertion hole 33 and the nut 30 of the movable connector 27.

Figure 5:
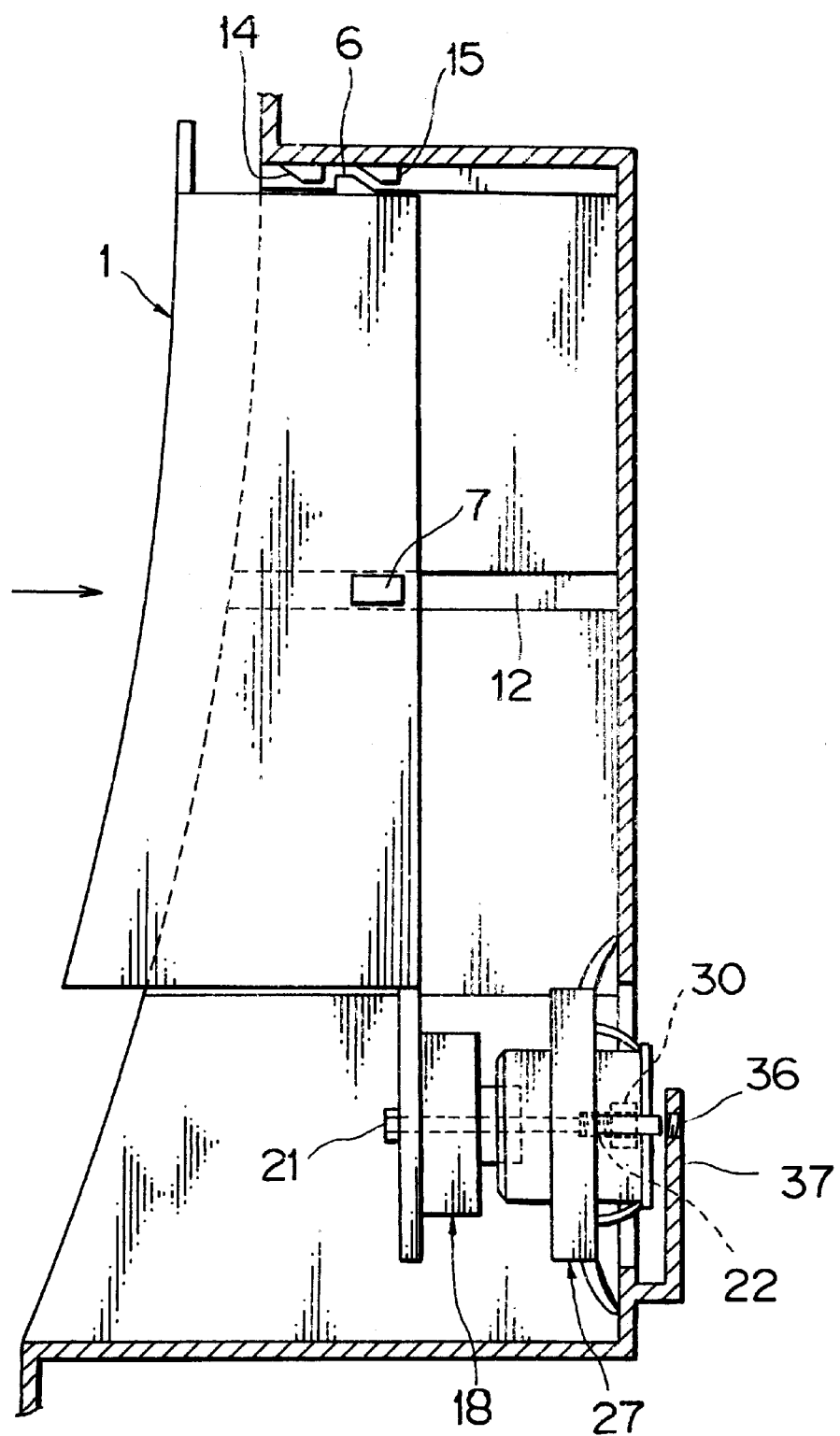
FIG. 5 is a longitudinal sectional view of the meter unit in preliminary locked position.

If the meter unit 1 is pushed in from the state as shown in FIG. 1, its lock projections 6, 7 slide inside the respective guide grooves 11, 12 until the lock projections 6 ride over the preliminary locking projections 14 and are engaged between the preliminary locking projections 14 and the full locking projections 15 as shown in FIG. 5, at which time the movable connector 27 is preliminarily locked to the fixed connector 18 as shown in FIG. 6. In other words, projections 40 on a nut support cylinder 39 of the movable connector 27 engage in apertures 42 in cylindrical walls 41 of the fixed connector 18. The resilient arms 28, 29 hold the movable connector 27 to the panel portion 25. The front end of the bolt 21 abuts against the nut 30, and the male and female connector portions 31 and 38 are in an initial coupled position to each other. The threaded hole 36 of the bracket 37 is located rearwardly of the panel portion 25 in opposition to the nut 30.

Figure 7:
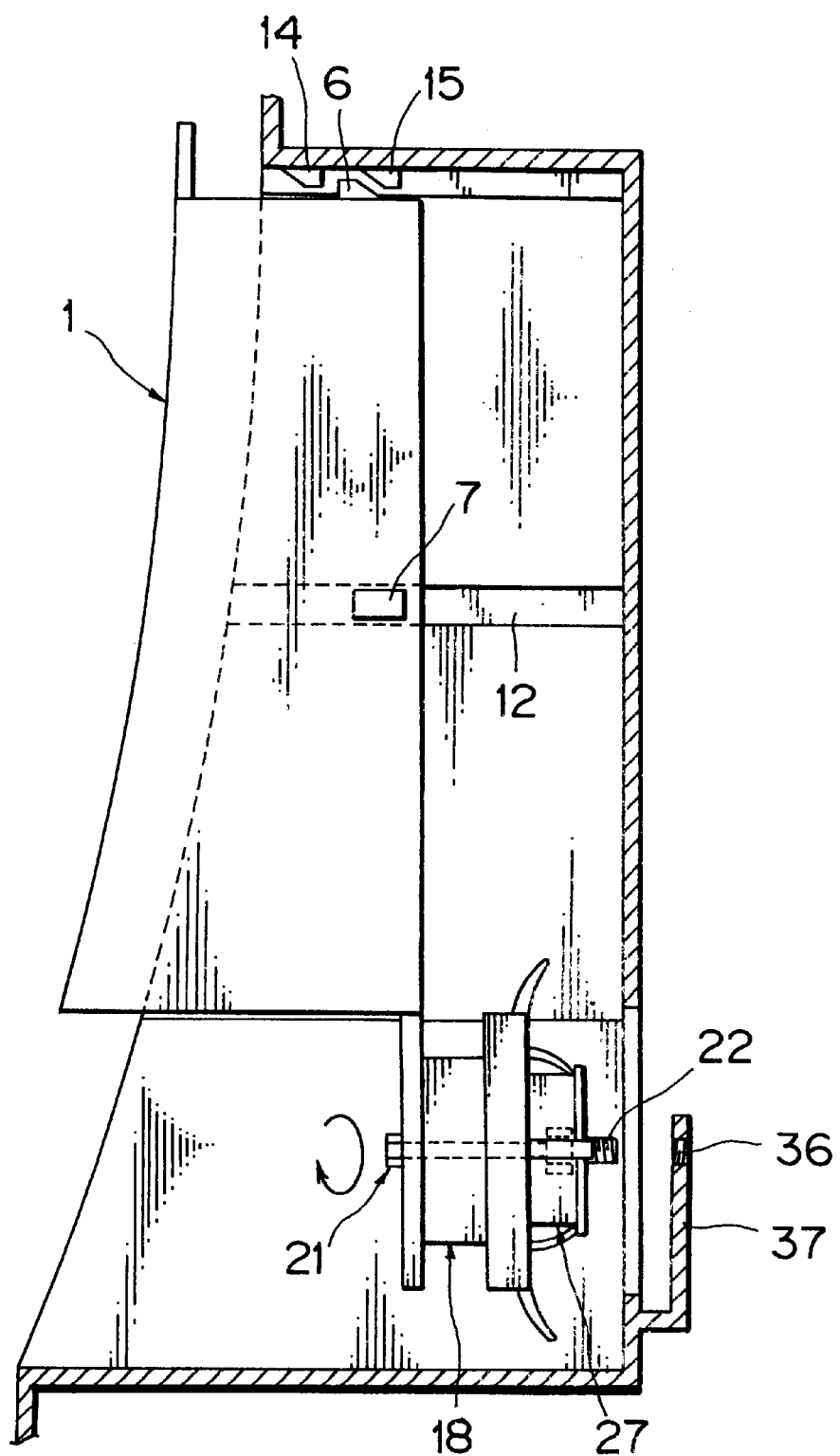
FIG. 7 is a longitudinal sectional view showing the connectors in coupled position to each other.

In this state, as shown in FIGS. 7 and 8, the bolt 21 is threaded into the nut 30 to draw the movable connector 27 to the fixed connector 18 side until the former is separated from the panel portion 25 and fully coupled to the latter (until the male connector portions 31 are fully coupled to the respective female connector portions 38), at which time the threaded portion 22 of the bolt 21 projects through the nut 30 and the movable connector 27 as shown in FIG. 8 and the bolt 21 becomes freely rotatable.

Figure 9:
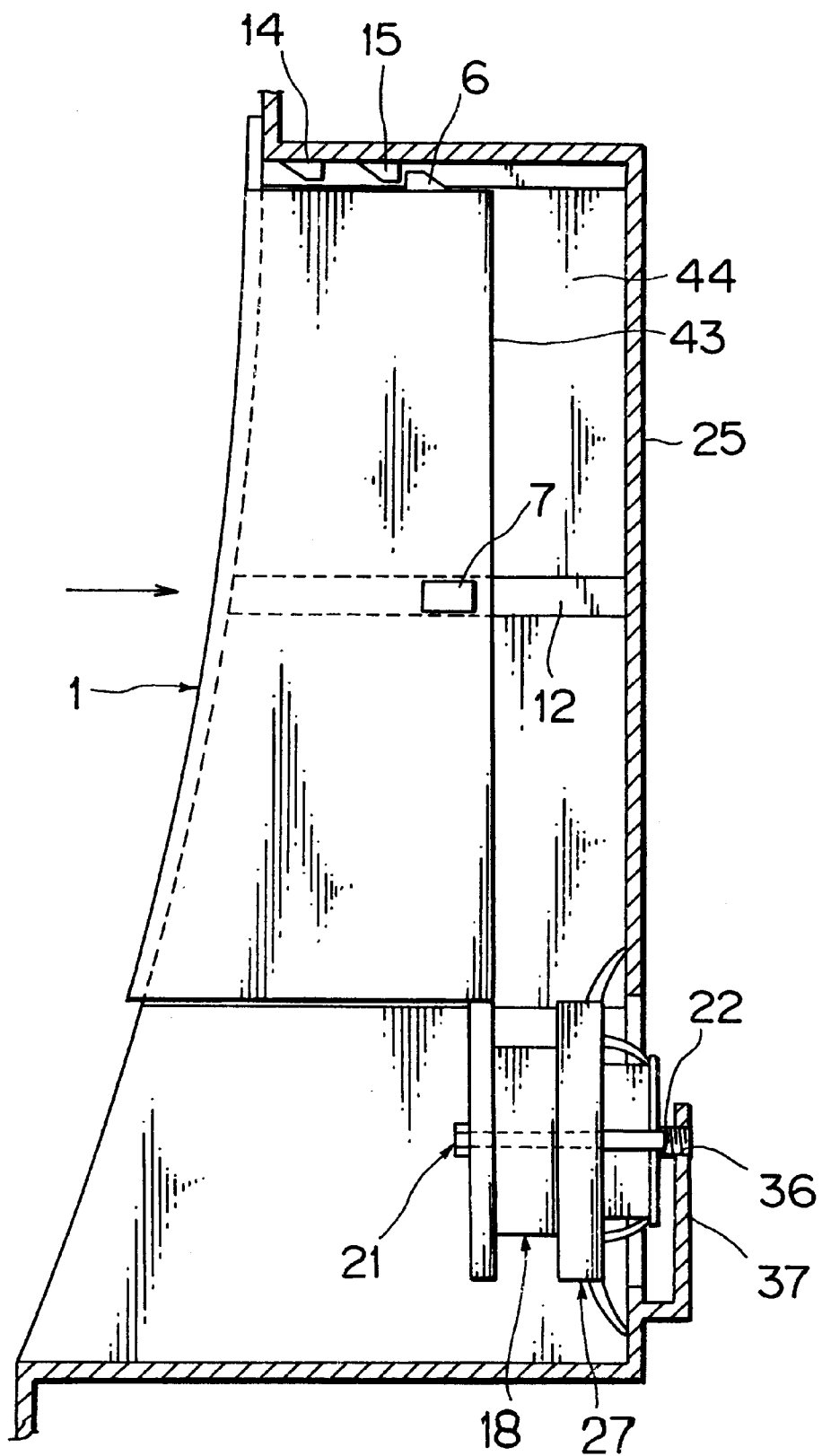
FIG. 9 is a longitudinal sectional view showing the meter unit fixed in the instrument panel.

If the meter unit 1 is further pushed in from the preliminary locked position as shown in FIG. 7, its lock projections 6 ride over the full locking projections 15 and the front end of the bolt 21 comes into contact with the threaded hole 36 of the bracket 37 as shown in FIG. 9. A clearance 44 remains between the rear surface 43 of the meter unit 1 and the panel portion 25.

Figure 3:
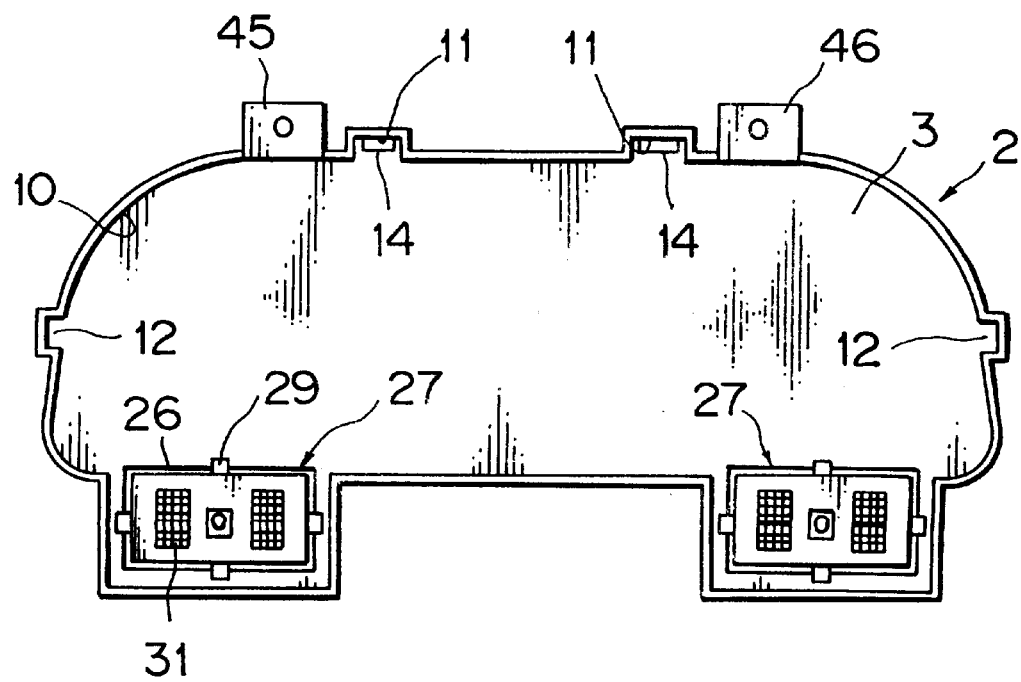
FIG. 3 is a front view of a meter mount portion of an instrument panel.
Figure 10:
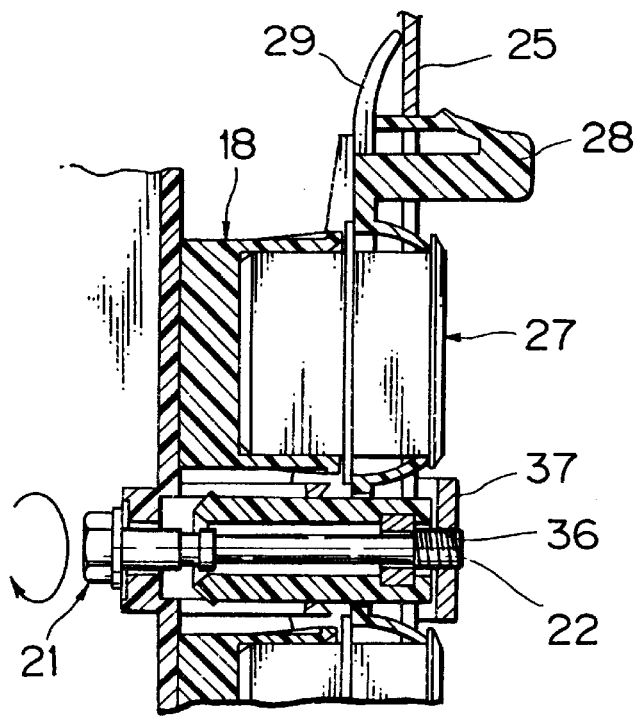
FIG. 10 is a horizontal sectional view of an essential portion when the meter unit is in fixed position.

In this state, the bolt 21 is rotated to have its threaded portion 22 thread into the threaded hole 36 of the bracket 37 as shown in FIG. 10 and to fix the meter unit 1 to the panel portion 25 through the bolt 21. The threaded portion 22 of the bolt 21 may become freely rotatable on passing the threaded hole 36 and completion of the screwing. The two fixing brackets 19 of the meter unit 1, as shown in FIG. 2, are then secured to the related brackets 45, 46 of the instrument panel 2 as shown in FIG. 3 by means of bolts (not shown) to complete the installation of the meter unit 1.

The series of operations as described above with reference to FIGS. 5 to 10 are also effective as a connecting and fixing method of instruments.

According to the present embodiment of this invention, the meter unit 1 is slided in two steps such that the bolt 21 serves not only to couple the fixed and movable connectors 18 and 27 together, but also to fix the meter unit 1 in the instrument panel 2. Thus, an advantage is obtained that as compared with the conventional structure in which four bolts are required for fixing purposes, only two bolts are required, leading to a reduction in the cost of parts and man-hours. If arrangements are made for fixing the meter unit 1 only with the bolts 21 without using a fixing bolt, a lag in timings of tightening bolts will be eliminated, resulting in a further improved meter installation efficiency.

FIGS. 11 to 15 show an instrument connecting and fixing structure according to another embodiment of this invention, in which a spacer 50 is used for moving a bolt 51 in two steps such that the bolt 51 serves to couple connectors 52 and 53 as well as to fix a meter unit 55 to a panel portion 54 of an instrument panel.

Figure 11:
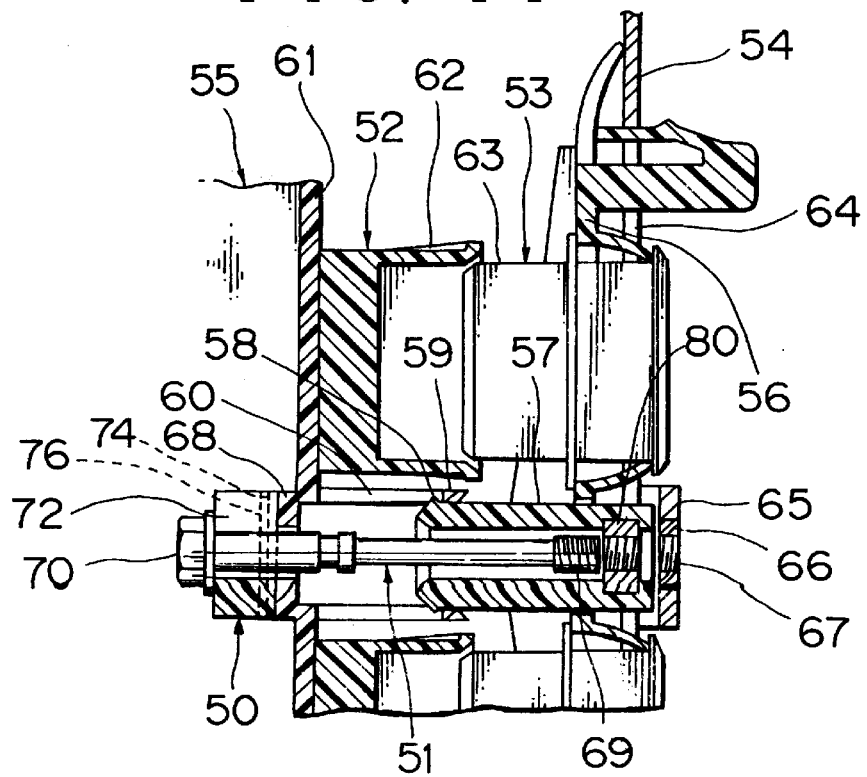
FIG. 11 is a horizontal sectional view of an instrument connecting and fixing structure according to another embodiment of this invention.

In FIG. 11, the fixed connector (first connector) 52 on the meter unit 55 side is preliminarily locked to the movable connector (second connector) 53 on the instrument panel 54 side. In other words, projections 58 provided on a nut support cylinder 57 at the center of a frame 56 of the movable connector 53 are engaged in apertures 60 in cylindrical walls 59 of the fixed connector 52. The movable connector 53 may be provided with resilient arms similar to those in the preceding example (at 28, 29 in FIG. 6).

The fixed connector 52 has female connector portions 62 provided on the base plate (circuit plate) 61, and the movable connector 53 has male connector portions 63 provided on the frame 56. The male connector portions 63 may be fixed or movable. A bracket 65 is provided somewhat rearwardly of and in the vicinity of an opening 64 in the panel portion 54. The bracket 65 has a nut 66 and/or a threaded hole 67.

A spacer 50 is removably provided on a seat (boss) 68 on the base plate 61 of the fixed connector 52. A head 70 of a bolt 51 is located in contact with the other side of the spacer 50.

Figure 12A:
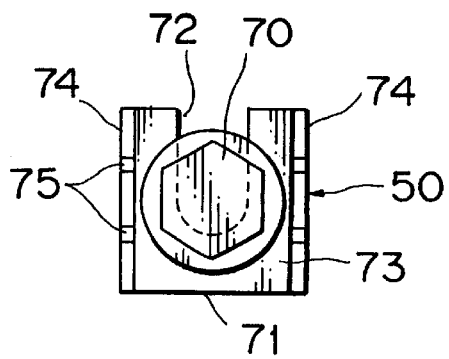
FIGS. 12 and 12B are plan and side views, respectively, of a spacer.
Figure 12B:
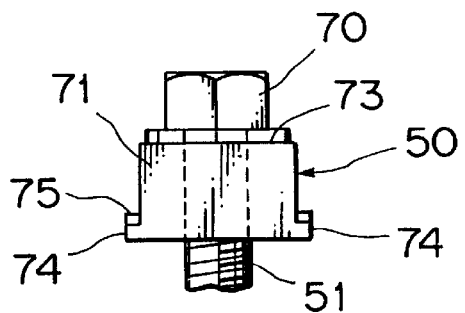

FIGS. 12A and 12B show the spacer 50. The spacer 50 is formed of synthetic resin and consists of a rectangular mount plate 71 and a U-shaped cutout 72 formed at the center of the mount plate for insertion therethrough of the bolt 51. The top surface 73 of the mount plate 71 forms a seat and slide surface for the bolt head 70. A pair of thin slide portions 74 are provided projecting at opposite sides at the bottom of the mount plate 71. Each slide portion 74 has locking projections 75 formed thereon.

Figure 13A:
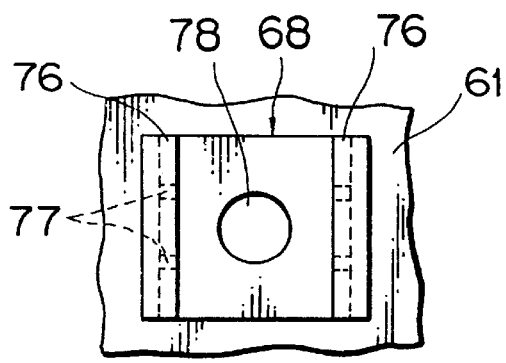
FIGS. 13A and 13B are plan and side views, respectively, of a seat for the spacer.
Figure 13B:
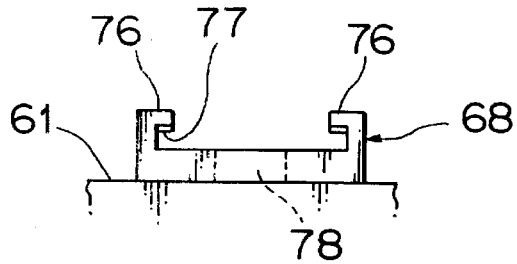

FIGS. 13A and 13B show the seat 68 for the spacer 50. The seat 68 is integrally formed with the base plate 61 of synthetic resin and has a pair of opposed guide rails 76 for the slide portions 74 of the mount plate 71. Each guide rail 76 has projections 77 on the inside for engagement with the related locking projections 75 on the spacer 50 side. The seat 68 is at the center formed with a bolt insertion hole 78.

In FIG. 11, the front end of the bolt 51 is in contact with the nut 80 which is at the innermost side (frame 56 side) of the nut support cylinder 57. The slide portions 74 of the spacer 50 are engaged with the respective guide rails 76 of the seat 68, with their locking projections 75 preliminarily engaged with the projections 77, i.e., with a weak force.

Figure 14:
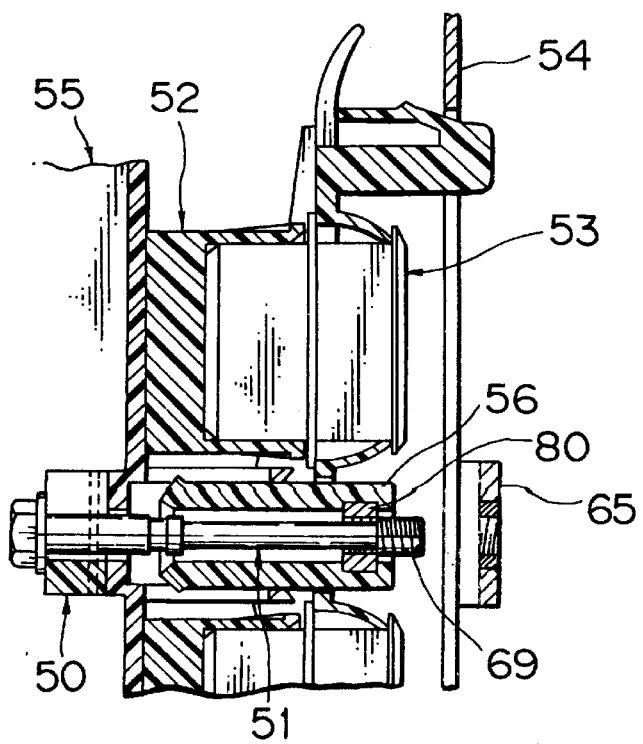
FIG. 14 is a horizontal sectional view of connectors in coupled position to each other.

If the bolt 51 is rotated in this state, the threaded portion 69 of the bolt 51 threads into the nut 80 to move the movable connector 53 apart from the panel portion 54 and into coupling with the fixed connector 52 as shown in FIG. 14. The threaded portion 69 of the bolt 51 passes the nut 80 and projects beyond the frame 56 of the movable connector 53 toward the panel portion 54, at which time the bolt 51 becomes freely rotatable. The connector 52 and thus the connector 53 are, together with the meter unit 55, fixed to the instrument panel including the panel portion 54 (the same state as in FIG. 20 showing the related art) and forwardly and rearwardly immovable.

Figure 15:
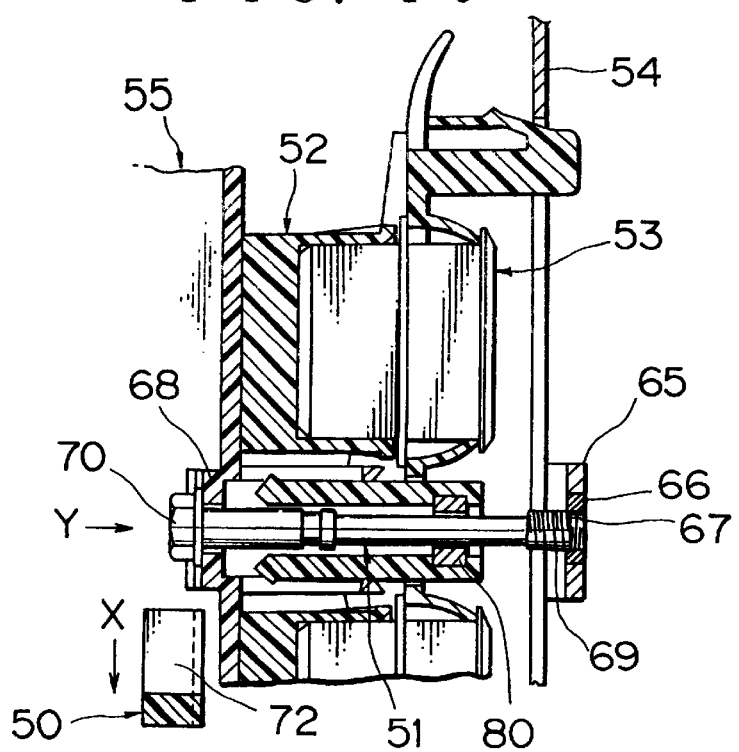
FIG. 15 is a horizontal sectional view showing a meter unit in fixed position.

The spacer 50 is then removed from the seat 68 as shown in FIG. 15. In other words, the spacer 50 is pulled in the direction of an arrow X to disengage the locking projections 75 from the projections 77 and slide the slide portions 74 out of the guide rails 76. The bolt 51 is then moved in the direction of an arrow Y toward the panel portion 54 and into abutment at its front end against the threaded hole 67 of the nut 66 in the bracket 65, at which time the bolt head 70 is not yet in contact with the seat 68. Further rotation of the bolt 51 causes the threaded portion 69 to thread into the threaded hole 67 of the bracket 65, the bolt head 70 to contact the seat 68, and the meter unit 55 to be fixed to the panel portion 54.

The series of operations as described above with reference to FIGS. 11, 14 and 15 are also effective as a connecting and fixing method for instruments.

According to the present embodiment of this invention, since the bolt 51 can be easily axially moved on removal of the small, lightweight spacer 50, the coupling of the connectors 52 and 53 and the fixing of the meter unit 55 to the panel portion 54 can be smoothly and reliably effected by means of the bolt 51.

Figure 16:
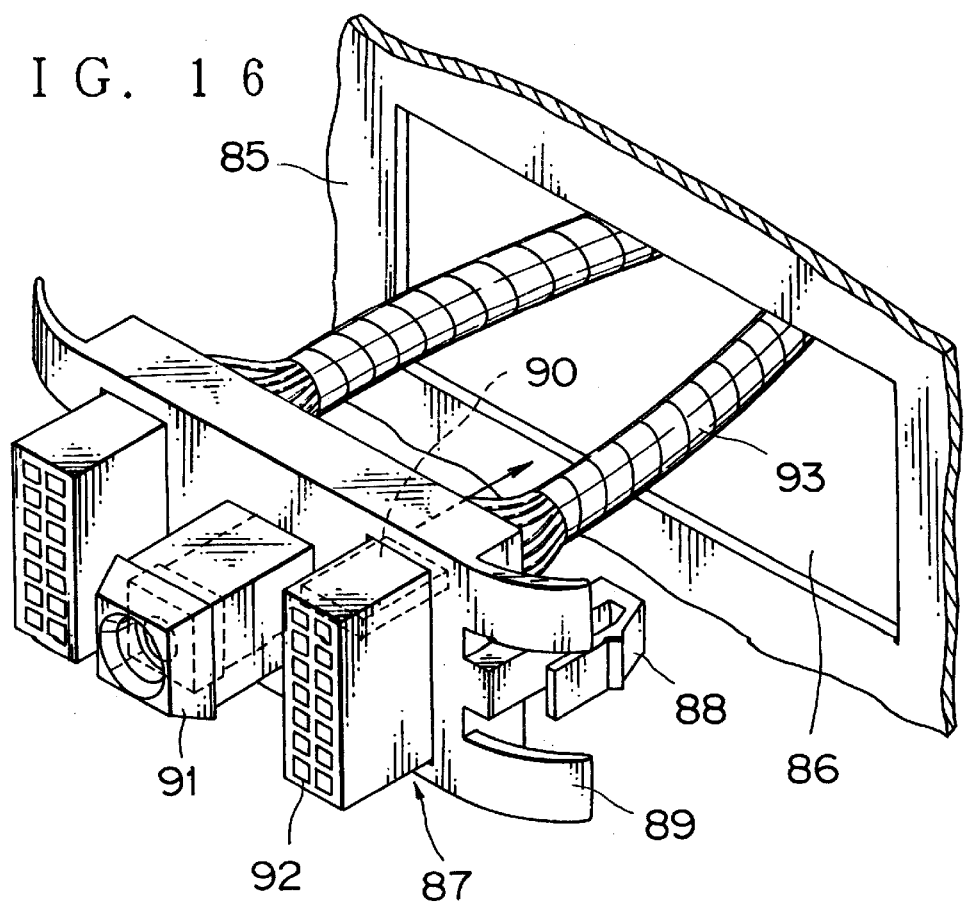
FIG. 16 is a perspective view of a movable connector about to be mounted.
Figure 17A:
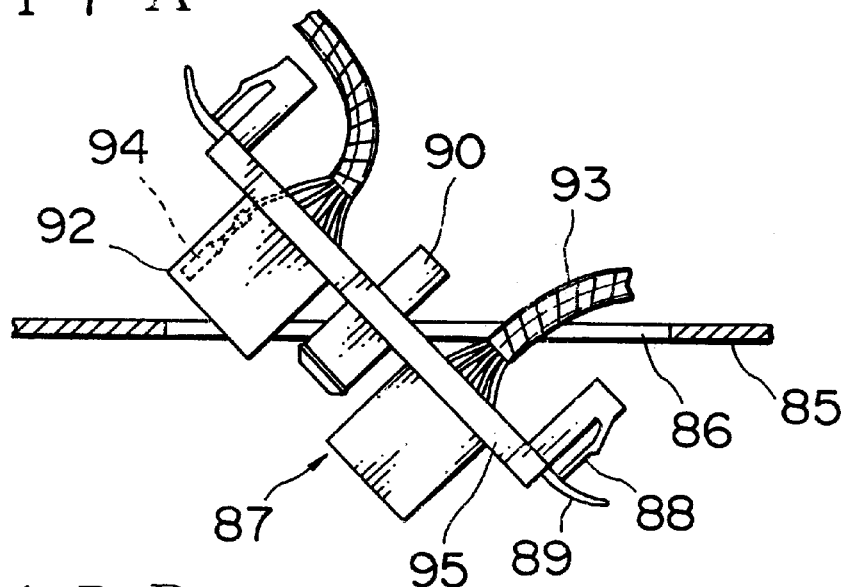
FIGS. 17A, 17B and 17C are horizontal sectional views showing how the movable connector is mounted.
Figure 17B:
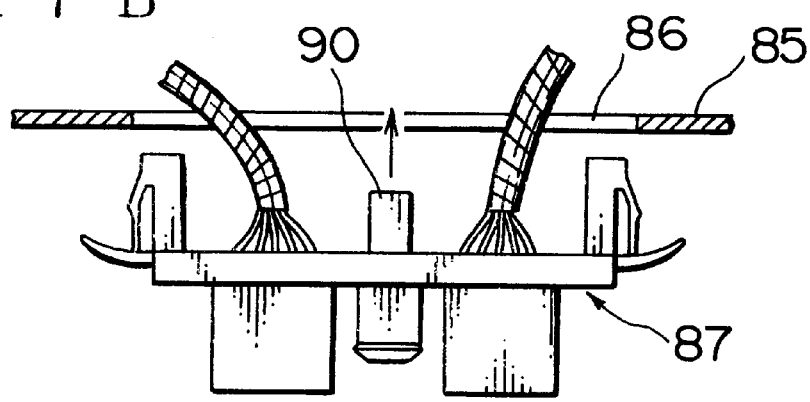
Figure 17C:
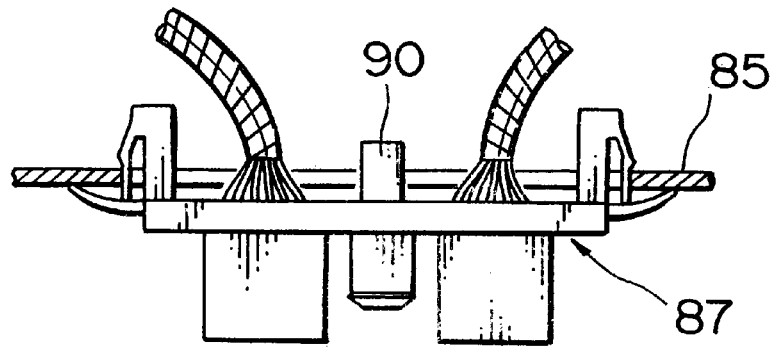
Figure 18:
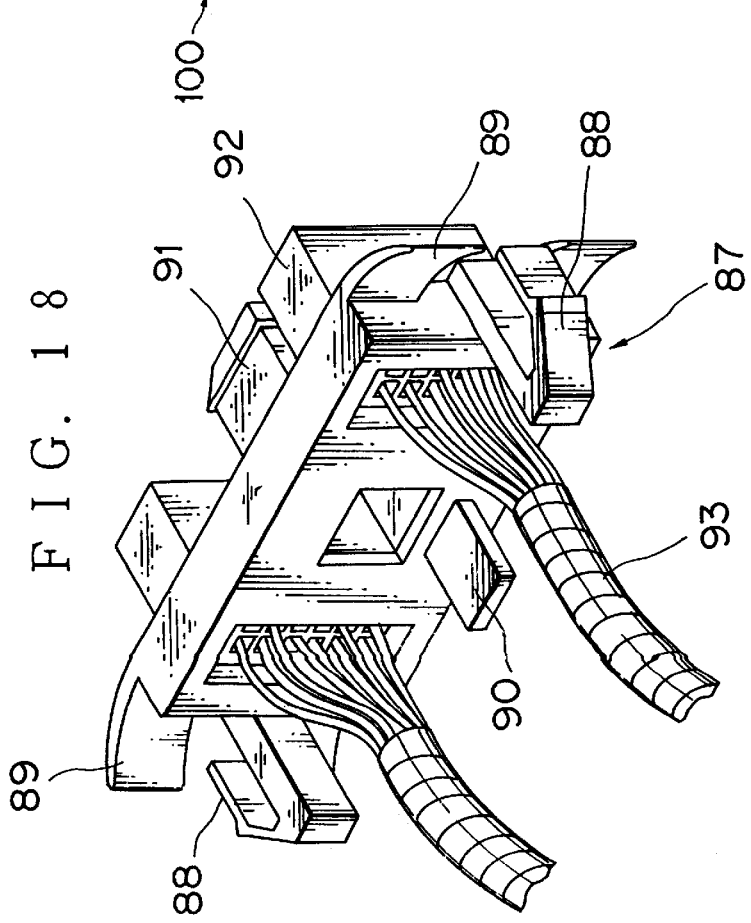
FIG. 18 is a perspective view showing the rear side of the movable connector.
Figure 19:
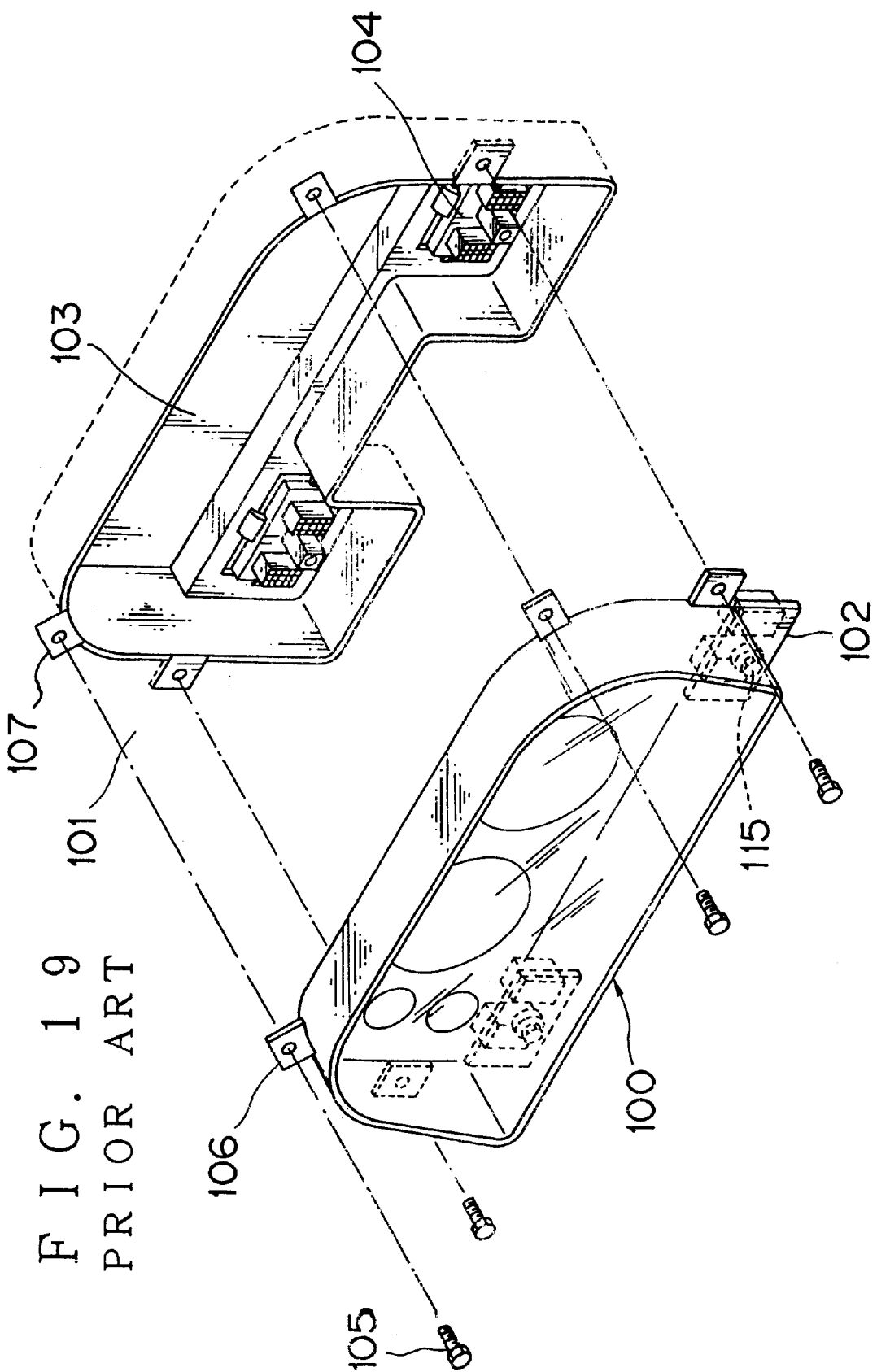
FIG. 19 is an exploded perspective view of a conventional instrument connecting and fixing structure.
Figure 21:
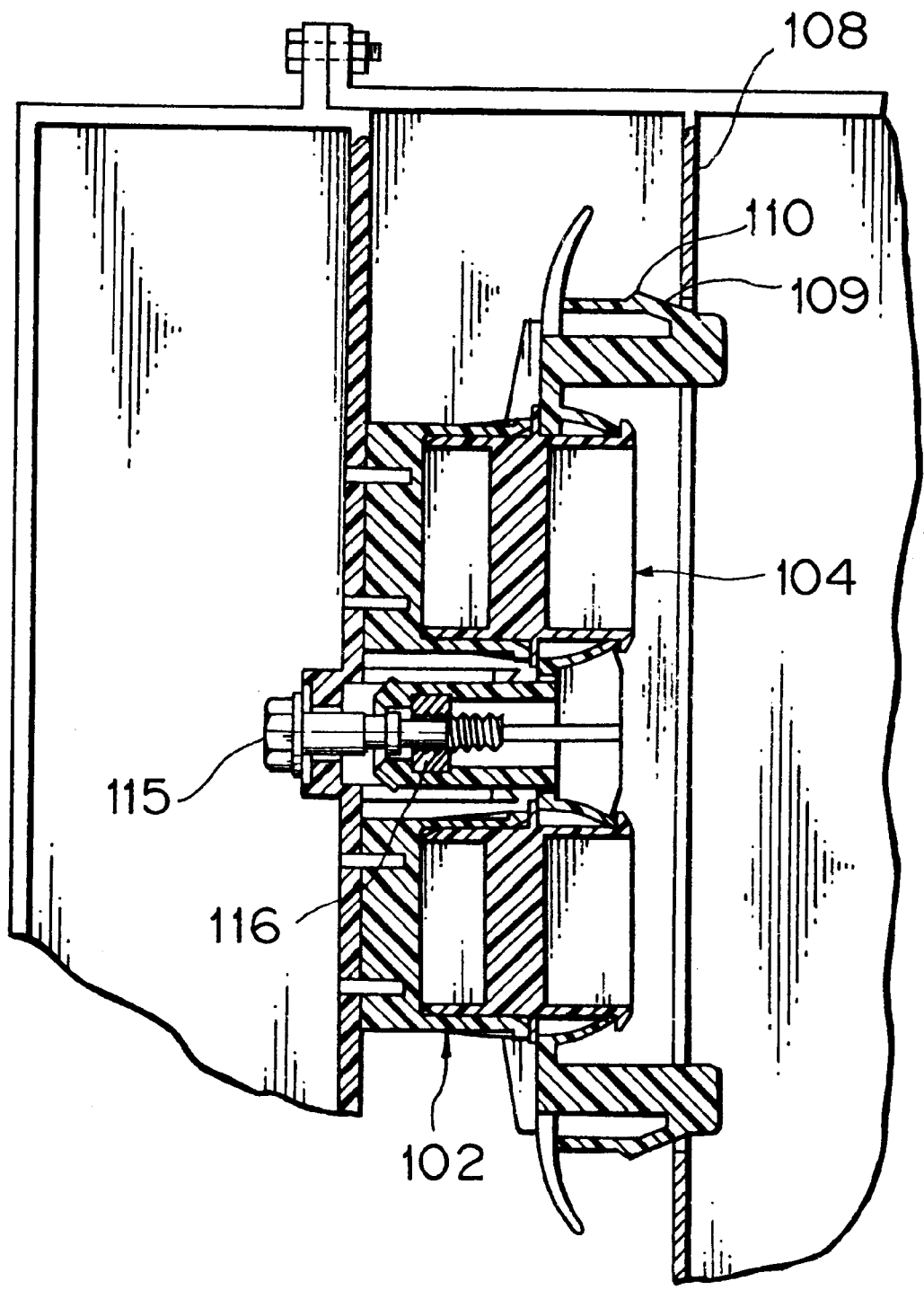
FIG. 21 is a horizontal sectional view of the conventional structure in which the connectors are fully coupled.

FIGS. 16 to 18 show how a movable connector 87 is preliminarily locked in an opening 86 in a panel portion 85 of an instrument panel.

In order to have the movable connector 87 engaged in position in the opening 86 in the panel portion 85, an operator first inserts the movable connector 87 slantingly through the opening 86 as shown in FIG. 17A, and then pulls back the movable connector 87 at a projecting plate 90 provided at the rear side of a movable connector frame 95 as shown in FIGS. 16, 17B and 18 so as to bring the resilient arms 88 into the opening 86 and into engagement with edges of the latter and the resilient arms 89 into abutment against the panel portion 85 as shown in FIG. 17C. The movable connector 87 is supported by the resilient arms 89 to be forwardly and rearwardly movable and by the resilient arms 88 to be laterally movable. To the movable connector 87 is coupled, for example, a fixed connector (at 18 in FIG. 6) on the side of an instrument.

As shown in FIG. 18, the projecting plate 90 is provided near the center of the frame 95 (below the nut support cylinder 91 in the present embodiment). On opposite sides of the projecting plate 90 are located wiring harnesses 93 from the respective male connector portions 92. The projecting plate 90, being located at substantially the center of the movable connector 87, does not interfere with the panel portion 85 after connectors have been coupled and thus does not give rise to noises and the like.

While in the above example, the projection is shown to be the projecting plate 90, it is also possible to use other forms of projections such as a cylinder insofar as they provide a grip for handling the movable connector. The projection, if in the form of a plate such as the projecting plate 90, will be free of rotation in handling the movable connector 87.

According to the present embodiment of this invention, the movable connector 87 can be smoothly and reliably set to the panel portion 85 without pulling at the wiring harness (es) 93. Since the wiring harness(es) 93 is not pulled, prevention is made of terminals 94 from slipping out of the connector portion 92, damages and the like.

Having now fully described the invention, it will be apparent to one of ordinary skill in the art that many changes and modifications can be made thereto without departing from the spirit and scope of the invention as set forth herein.

What is claimed is:

1. A connecting and fixing structure for instruments comprising;
   an instrument having a first connector;
   an instrument panel having a second connector supported therein;
   a bolt having a threaded portion extending from said first connector toward said second connector;
   a first thread means provided in said second connector, cooperating with said bolt; and
   a second thread means provided on said instrument panel at a position axially behind said first thread means,
   wherein with said bolt in a first position, said threaded portion is threaded into said first thread means to couple said first and second connectors together and then is uncoupled from said first thread means, and
   wherein said bolt, upon uncoupling from said first thread means, is moved axially with respect to said first thread means to a second position in which said bolt projects beyond said first thread means, said threaded portion of said bolt being threadable into said second thread means to fix said instrument to said instrument panel.

2. The structure according to claim 1, wherein said instrument is preliminarily locked to said instrument panel to maintain said bolt in said first position.

3. The structure according to claim 2, wherein said first connector is fixed to said instrument and said second connector is movable such that the threading of said bolt into said first thread means draws said second connector into coupled relation with said first connector.

4. The structure according to claim 3, wherein said threaded portion of said bolt is disposed at the front end which comes out of thread engagement with said first thread means on completion of the coupling of said first and second connectors.

5. The structure according to claim 4, wherein said instrument is pushed further inwardly of said instrument panel to move said bolt into said second position.

6. The structure according to claim 1, wherein said instrument is fixed relative to said instrument panel, and further comprising a spacer which is provided between a head of said bolt and said first connector to put said bolt in said first position and which is removed to put said bolt into said second position.

7. The structure according to claim 6, wherein said first connector is fixed to said instrument and said second connector is movable.

8. The structure according to claim 7, wherein said threaded portion of said bolt is disposed at the front end which comes out of thread engagement with said first thread means on completion of the coupling of said first and second connectors.

9. The structure according to claim 1, wherein said first thread means comprises a nut.

10. The structure according to claim 1, wherein said first connector comprises a pair of spaced connector portions with said bolt passing at a center therebetween, and said second connector comprises a pair of spaced connector portions with said first thread means arranged at a center therebetween.

11. The structure according to claim 10 wherein said pair of first connector portions are provided in spaced relation at a lower end of said instrument, and said pair of second connector portions are correspondingly provided in spaced relation inside said instrument panel.

12. The structure according to claim 1, wherein said second connector has a projection at a rear side thereof for initially arranging said second connector in position in said instrument panel.

13. A method for connecting and fixing an instrument with a first connector to an instrument panel with a second connector supported therein, comprising the following steps of:

extending a threaded portion of a bolt in a first position from said first connector to a threaded means on said second connector to couple said first and second connectors together;

disengaging said bolt from the first and second connector by extending said bolt through the threaded means on said second connector;

moving said bolt axially to a second position in which said bolt projects beyond said first connector; and threading said bolt in said second position into said instrument panel to fix said instrument to said instrument panel.

14. The method according to claim 13, wherein said step of threading said bolt in said first position includes preliminary locking said instrument to said instrument panel to maintain said bolt in said first position, and said step of moving said bolt to said second position comprises pushing said instrument further into said instrument panel.

15. The method according to claim 13, wherein said step of threading said bolt in said first position comprises threading said bolt with a spacer provided between a head of said bolt and said first connector, and said step of moving said bolt to said second position comprises removing said spacer.

* * * * *